United States Patent [19]

Abrevaya et al.

[11] Patent Number: 5,012,027

[45] Date of Patent: Apr. 30, 1991

[54] DUAL PROFILE SURFACE-IMPREGNATED DEHYDROGENATION CATALYST AND PROCESS

[75] Inventors: Hayim Abrevaya, Wilmette; Tamotsu Imai, Mt. Prospect, both of Ill.

[73] Assignee: UOP, Des Plaines, Ill.

[21] Appl. No.: 435,150

[22] Filed: Nov. 9, 1989

Related U.S. Application Data

[60] Continuation-in-part of Ser. No. 289,137, Dec. 23, 1988, Pat. No. 4,880,764, which is a continuation-in-part of Ser. No. 221,977, Jul. 20, 1988, Pat. No. 4,827,072, which is a division of Ser. No. 131,882, Dec. 11, 1987, Pat. No. 4,786,625, which is a continuation-in-part of Ser. No. 18,541, Feb. 25, 1987, Pat. No. 4,716,143, which is a continuation-in-part of Ser. No. 871,356, Jun. 6, 1986, abandoned.

[51] Int. Cl.$^5$ .................. C07C 2/00; C07C 4/00; C07C 5/00
[52] U.S. Cl. .................. 585/443; 502/326; 502/327; 502/328; 502/330; 502/349; 502/352; 502/514; 502/523; 502/527; 585/660
[58] Field of Search ............. 502/326, 327, 328, 330, 502/349, 352, 514, 523, 527; 585/443, 444, 445, 660

[56] References Cited

U.S. PATENT DOCUMENTS

| | | | |
|---|---|---|---|
| 4,431,750 | 2/1984 | McGinnis et al. | 502/329 |
| 4,520,223 | 5/1985 | McGinnis et al. | 585/629 |
| 4,716,143 | 12/1987 | Imai | 502/326 |
| 4,786,625 | 11/1988 | Imai et al. | 502/326 |
| 4,827,072 | 5/1989 | Imai et al. | 585/443 |
| 4,880,764 | 11/1989 | Imai et al. | 502/326 |

*Primary Examiner*—Asok Pal
*Attorney, Agent, or Firm*—Thomas K. McBride; John F. Spears, Jr.

[57] ABSTRACT

A novel catalytic composite and a process for its use is disclosed. The catalyst composite comprises a first component selected from Group IA and Group IIA elements of the Periodic Table of the Elements, a second component selected from iridium, and osmium, or mixtures thereof, a third component selected from the elements of Group IVA of the Periodic Table of the Elements, platinum, and a support having a nominal dimension (d) of from 50 to 10,000 microns. The catalytic composite is characterized in that both the second component and platinum are surface-impregnated upon the support, with the concentration gradient of the second component being steeper than that of platinum. The second component is eggshell surface-impregnated.

24 Claims, 2 Drawing Sheets

DUAL PROFILE SURFACE-IMPREGNATED DEHYDROGENATION CATALYST AND PROCESS

CROSS-REFERENCE TO RELATED APPLICATIONS

This application is a continuation-in-part of prior copending application Ser. No. 289,137 filed Dec. 23, 1988 now U.S. Pat. No. 4,880,764, which is a continuation-in-part of application Ser. No. 221,977 filed July 20, 1988, now U.S. Pat. No. 4,827,072, which in turn is a Rule Division of application Ser. No. 131,882 filed Dec. 11, 1987, now U.S. Pat. No. 4,786,625 which is a continuation-in-part of application Ser. No. 018,541 filed Feb. 25, 1987, now U.S. Pat. No. 4,716,143, which is a continuation-in-part of application Ser. No. 871,356 filed June 6, 1986, now abandoned.

BACKGROUND OF THE INVENTION

This invention relates to the conversion of hydrocarbons, especially the dehydrogenation of dehydrogenatable hydrocarbons, in the presence of a catalyst composite. This invention also pertains to a new catalyst composite.

The dehydrogenation of hydrocarbons is an important commercial process because of the great demand for dehydrogenated hydrocarbons for the manufacture of various chemical products such as detergents, high octane gasolines, pharmaceutical products, plastics, synthetic rubbers, and other products well known to those skilled in the art. One example of this process is the dehydrogenation of isobutane to produce isobutylene which can be polymerized to provide tackifying agents for adhesives, viscosity-index additives for motor oils and impact-resistant and anti-oxidant additives for plastics.

INFORMATION DISCLOSURE

Several catalytic composites relevant to the composition of the instant invention are disclosed in the art. However, no references or combination of references discloses the unique combination of components of the catalyst of this invention. U.S. Pat. No. 4,672,146 discloses a catalytic composite comprising a Group VIII noble metal which was co-formed with a Group IVA metal component, and an alkali metal or alkaline earth metal component, and an alumina support with particular properties. U.S. Pat. Nos. 3,936,395 and 4,003,852 both disclose a catalytic composite containing platinum or palladium, iridium, an alkali or alkaline earth metal, and a fourth component. The fourth component of the '852 patent may be tin or lead while the fourth component of the '395 patent is germanium. In all three of these patents, it is specifically disclosed and claimed that all components are uniformly impregnated upon the non-acidic catalytic composite. These patents are distinguished from the catalyst of the instant invention in that the platinum, and the iridium or osmium component, of the instant catalyst are surface-impregnated on the catalyst support.

Numerous catalytic composites comprising a Group VIII metal component and a metal component selected from the group consisting of a tin component, germanium component, rhenium component, and mixtures thereof are known. For example related U.S. Pat. Nos. 3,632,503, 3,755,481, and 3,878,131 disclose catalytic composites comprising a platinum group component, a tin component, and a germanium component on a porous support. However, these references disclose that best results are achieved when a germanium component is uniformly distributed throughout the support. These references are silent as to any advantage to be achieved by limiting the location of substantially all of a metal or a component to an outer layer of the support. In fact, these references indicate preference that the catalytic composite be subjected to a substantially water-free reduction step prior to its use in the conversion of hydrocarbons. It is further disclosed that the step is designed to ensure a uniform and finely divided dispersion of metallic components throughout the carrier material.

Related U.S. Pat. Nos. 3,682,838 and 3,761,531 disclose catalytic composites comprising a platinum group component, and a Group IVA metallic component. As with the previous references it is disclosed therein that it is preferred that the catalysts are subjected to a reduction step prior to their use. It is further disclosed in these references that the reduction step is designed to assure uniform distribution of the metallic particles throughout the support.

U.S. Pat. Nos. 3,558,477, 3,562,147, 3,584,060 and 3,649,566 all disclose catalytic composites comprising a platimun group component, and a rhenium component on a refractory oxide support. However, these references disclose that the best results are achieved when the platinum group component and rhenium component are uniformly distributed throughout the surface and pores of the support.

U.S. Pat. No. 3,897,368 describes a method for the production of a catalytic composite containing a noble metal where the noble metal is platinum and the platinum is the only catalytic metal present and it is deposited selectively upon the external surface of the catalyst. The '368 patent describes a method of producing a catalyic composite containing platinum only, by impregnating platinum on the outside layer of the support. The method claimed in the '368 patent utilizes a non-ionic surface active agent to achieve the surface impregnation of the noble metal.

Additionally, U.S. Pat. Nos. 3,651,167; 3,367,888; 3,931,054; and 3,259,589 all teach methods of impregnating a support with a Group VIII metal component that is similar to the method employed to produce the surface-impregnated catalyst of the instant invention. However, the '054 patent describes a method of impregnating a support such that the Group VIII metal component is located below the surface of the support. In addition, the '368, '888, and '589 patents describe a method of making catalytic composite where said catalytic composite does not contain the useful metal components of the instant invention. The '167 patent is distinguishable because it does not teach the use of a Group IVA component or the use of two surface-impregnated components. Thus, while these disclosures describe a portion of the method used to fabricate the catalytic composite of the instant invention, they do not teach the entire method as described herein.

U.S. Pat. Nos. 3,755,481; 3,761,531; and 4,104,317 teach that platinum may be impregnated onto a calcined support which comprises a metal component. Unlike the instant application, none of these references disclose that the platinum may be surface impregnated or suggest that a nonuniform platinum distribution is desirable.

BRIEF SUMMARY OF THE INVENTION

The invention is a hydrocarbon dehydrogenation catalyst and a hydrocarbon dehydrogenation process which utilizes the catalyst. The catalyst is characterized in that it comprises two surface-impregnated components, each having a separate and distinguishable spatial distribution, but with both components existing in higher relative concentrations near the outer surface. The distribution of the platinum component is always skewed less heavily toward the outer surface of the catalyst than is the distribution of the component which comprises iridium, osmium, or mixtures thereof. The second component is eggshell surface-impregnated.

All known dehydrogenation catalysts undergo a progressive loss of activity and selectivity under commercial processing conditions which eventually necessitates their regeneration or replacement. Much of this loss is due to a buildup of high molecular weight hydrocarbons, often referred to as coke, in the pores and on the active surfaces of the catalyst. While this coke buildup inhibits activity and selectivity in all parts of the catalyst, it is most damaging when it occurs in catalyst pores which are near the outside surface of the catalyst. Once these crucial outer pores become blocked, the dehydrogenation chargestock is effectively prevented from diffusing to catalytic sites deeper in the catalyst. Loss of access to catalytic sites causes decreased dehydrogenation activity, higher severity, and lower selectivity.

The pores near the outer surface of the catalyst of this invention are more resistant to coke fouling than those of prior art catalysts which did not contain surface-impregnated iridium or osmium. Additionally, much of the platinum of this catalyst lies near the outer surface so that it is less affected by the fouling that does occur. Overall, the catalyst of this invention exhibits superior stability and will require less frequent regeneration and replacement.

DETAILED DESCRIPTION OF THE INVENTION

Figure 1:
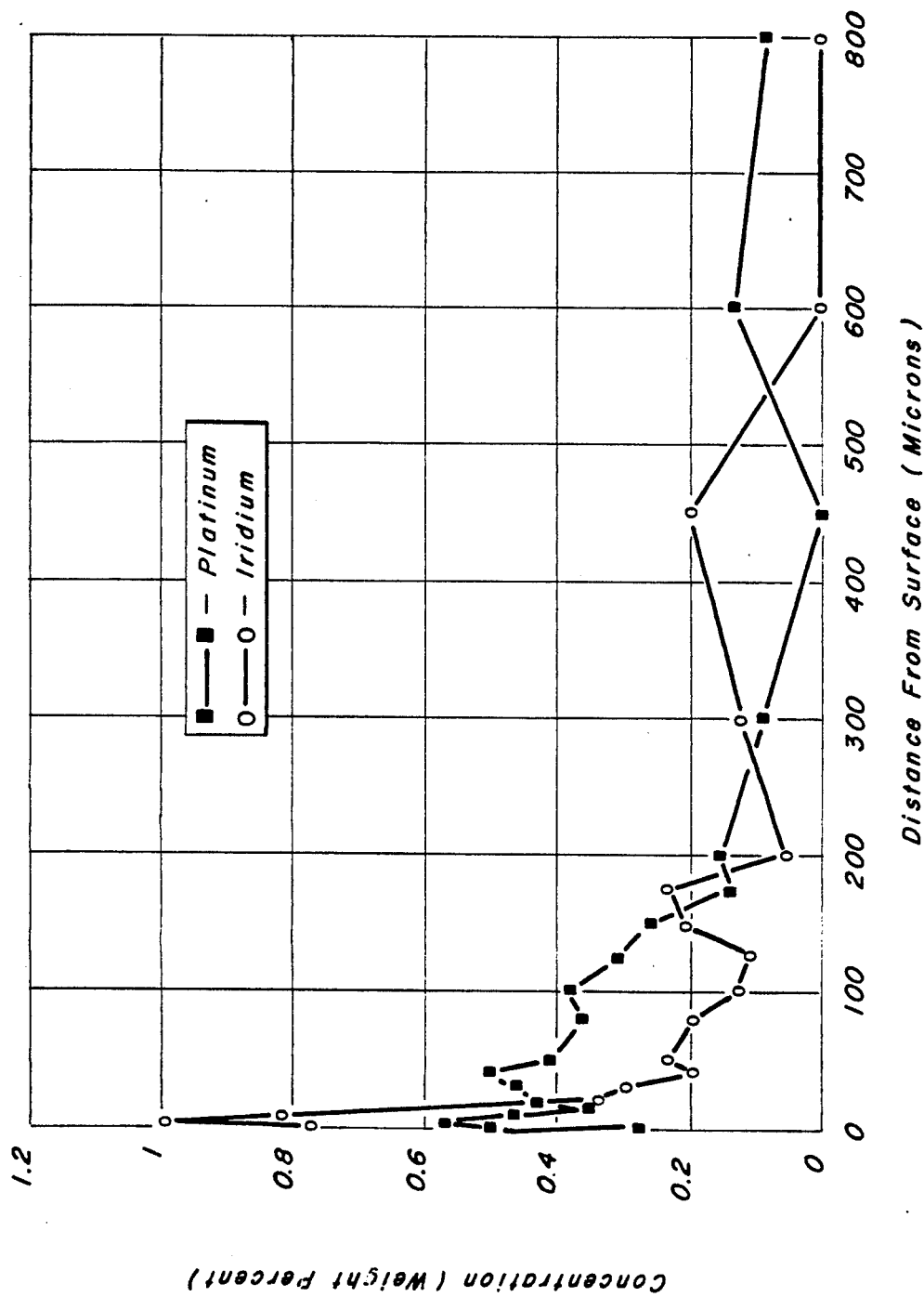
FIGS. 1 and 2 are graphical representations of the iridium metal and platinum metal distributions acrossh the radii of the catalysts of Examples II and III, respectively. Each metal distribution is presented as the local concentration of an element in weight percent plotted against the distance in microns from the surface of the particle. The metal distributions were determined by utilizing an energy dispersive X-ray analyzer (EDX) coupled to a scanning electron microscope (SEM). Each Figure represents data obtained from one individual catalyst sphere.

It is an object of the present invention to provide an improved catalytic composite. A corollary objective is to provide an improved process for the conversion of hydrocarbons and especially for the dehydrogenation of dehydrogenatable hydrocarbons using the improved catalytic composite.

Accordingly, in a broad embodiment, the present invention is a catalytic composite comprising a first component selected from Group IA and Group IIA elements of the Periodic Table of the Elements or mixtures thereof, a second component selected from iridium, osmium, or mixtures thereof, a third component selected from one or more elements of Group IVA of the Periodic Table of the Elements, platinum, and a refractory oxide support having a nominal dimension (d) of from 50 to 10,000 microns, the catalytic composite characterized in that the platinum is surface-impregnated upon the catalytic composite such that the average concentration of platinum in the outer 0.2 d layer of the support is at least 2.0 times the average concentration of the platinum in the 0.4 d core of the support, in that the second component is surface-impregnated upon the support such that the average concentration of the second catalytic modifier component in the outer 0.2 d layer of the support is at least 2.5 times the average concentration of the second component in the 0.4 d core of the support, and in that the ratio of said outer 0.2 d layer platinum average concentration to said 0.4 d core platinum average concentration is always less than the ratio of said outer 0.2 d layer second component average concentration to said 0.4 d core second component average concentration.

In a most preferred embodiment, this invention is a catalytic composite comprising from 0.1 to 5.0 wt. % lithium, from 0.1 to 2.0 wt. % iridium, from 0.1 to 5.0 wt. % tin, from 0.1 to 2.0 wt. % platinum, and an alumina support having a nominal dimension (d) of about 50 to 2500 microns, and characterized in that the platinum is surface-impregnated such that the average concentration of platinum in the outer 0.2d layer of the alumina support is at least 2.0 times the average concentration of the platinum in the 0.4 d core of the alumina support, in that the iridium is surface impregnated such that the average concentration of the iridium in the outer 0.2 d layer of the alumina support is at least 2.5 times the average concentration of the iridium in the 0.4 d core of the support, and in that the ratio of said outer 0.2 d layer platinum average concentration to said 0.4 d core platinum average concentration is always less than the ratio of said outer 0.2 d layer second component average concentration to said 0.4 d core second component average concentration.

In an alternative embodiment, the invention is a hydrocarbon conversion process comprising the steps of contacting a hydrocarbon at hydrocarbon conversion conditions with a catalytic composite comprising from from 0.01 to 10.0 wt. % of a first component selected from Group IA and Group IIA elements of the Periodic Table of the Elements or mixtures thereof, from 0.01 to 5.0 wt. % of a second component selected from iridium, osmium, or mixtures thereof, 0.01 to 5.0 wt. % platinum, from 0.01 to 10.0 wt. % of a third component selected from elements of Group IVA of the Periodic Table of the Elements or mixtures thereof, 0.01 to 5.0 wt. % platinum, and an alumina support having a nominal dimension (d) of from 50 to 10,000 microns, and recovering the products of the process, the hydrocarbon conversion process characterized in that the platinum of the hydrocarbon conversion catalyst is surface impregnated such that the average concentration of platinum in the outer 0.2 d layer of the alumina support is at least 2.0 times the average concentration of the platinum in the 0.4 d core of the alumina support, and in that the second component of the hydrocarbon conversion catalyst is surface impregnated such that the average concentration of the second component on the outer 0.2 d layer of the alumina support is at least 2.5 times the average concentration of the second component in the 0.4 d core of the alumina support, and in that the ratio of said 0.2 d layer platinum average concentration to said 0.4 d core platinum average concentration is always less than the ratio of said outer 0.2 d layer second component average concentration to said 0.4 d core second component average concentration.

In a most preferred embodiment, the hydrocarbon conversion process is a dehydrogenation process comprising the steps of contacting dehydrogenatable hydrocarbons having from 2 to 30 carbon atoms and a diluent gas present at a molar ratio of diluent gas to dehydrogenatable hydrocarbon of from 0.1 to 20 at dehydrogenation conditions including a temperature of from 400°–700° C., a pressure of from 0.1 to 5.0 atmospheres, and a liquid hourly space velocity of from 0.1 to 100 $hr^{-1}$ with a catalytic composite comprising from about 0.1 to about 5.0 wt. % lithium, from about 0.1 to 2.0 wt. % iridium, from 0.1 to 5.0 wt. % tin, from about 0.1 to about 2.0 wt. % platinum, and an alumina support having a nominal dimension (d) of from 850 to 2500 microns, the process characterized in that the platinum is surface impregnated such that the average concentration of the platinum in the outer 0.2 d layer of the alumina support is at least 2.0 times the average concentration of the platinum in the 0.4 d core of the support, in that the iridium component is surface impregnated such that the average concentration of the iridium in the outer 0.2 d layer of the alumina support is at least 2.5 times the average concentration of the iridium component in the 0.4 d core of the alumina support, and in that the ratio of said 0.2 d layer platinum average concentration to said 0.4 d core platinum average concentration is always less than the ratio of said outer 0.2 d layer second component average concentration to said 0.4 d core second component average concentration.

An essential feature of the catalytic composite of the present invention is that the platinum is surface-impregnated upon a support such that the average concentration of the platinum in the outer 0.2 d layer of the support is at least 2.0 times that of the 0.4 d core of the support, while the second component, which is selected from iridium, osmium and mixtures thereof, is surface-impregnated upon the support material such that the average concentration of the second component in the outer 0.2 layer of the support is at least 2.5 times that of the 0.4 d core of the support where d is the nominal dimension of the support. Furthermore, the second component is always relatively more concentrated near the outer surface than is the platinum. Thus, the present invention always comprises at least two distinct surface-impregnated metal components with different concentration profiles; one is concentrated in a narrow layer near the outer surface of the catalyst, and the other is relatively more concentrated in a narrow layer near the outer surface, as compared to the average concentration of the same component in an interior part of the support. The two surface-impregnated components differ in chemical composition and spatial distribution. The catalyst also comprises a first component selected from Group IA and Group IIA elements of the Periodic Table of the Elements or mixtures thereof. The catalyst also comprises a third component which is selected from Group IVA elements of the Periodic Table of the Elements or mixtures thereof. The Periodic Table and Groups to which reference is repeatedly made are correctly depicted on the back inside cover of the 51st edition of the "Handbook of Chemistry and Physics" published by the Chemical Rubber Company.

In calculating ratios of concentration, one must occasionally deal with reports of analyses which state that "nil", "trace", or "none" of a component was detected. It is best to avoid the mathematical difficulties which arise from computations involving a "zero" concentration by substituting a finite value of concentration in such calculations of concentration ratio. For purpose of this application, analytical values of nil, trace or none will be replaced by the value 0.01 wt. % in concentration ratio calculations.

It is to be understood that the terms "outside" and "outer" refer to the exterior of the support, that is the part in contact with process fluid bulk flow. By "layer", it is meant a stratum of substantially uniform thickness. The term "nominal dimension" means a distance which is two times the shortest distance from the outside surface to the innermost point of the support particle. By "core", it is meant the region of the support which is distant from the outside surface. It is to be understood that the nominal dimension of the instant support may vary from 50 to 10,000 microns. "Concentration gradient" is change in concentration with a unit change in distance, measured in a direction toward the outer surface of the support. Finally, by "0.2 d" and "0.4 d", it is meant that the nominal dimension (d) is multiplied by 0.2 or 0.4. The catalyst particle may be of any shape, including but not limited to spherical, cylindrical, polylobed, cellular, and honeycomb. The particular shape would influence selection of the dimension designated as the nominal diameter. For example, the nominal dimension of a sphere would be its diameter. The nominal dimension of a honeycomb would be its cell wall thickness.

Alternatively, where the catalyst composite has a nominal dimension of at about 1600 microns, the surface impregnated platinum may be described as being on average at least 2.0 times as concentrated in the outer 320 micron layer of the support in comparison to the average concentration of the second component in the 640 micron core of the support, and the surface impregnated second component may be described as being on average at least 2.5 times as concentrated in the outer 320 micron layer of the support in comparison to the average concentration of the second component in the 640 micron core of the support.

A metal, such as platinum, is considered to be surface-impregnated when the average concentration of said platinum within the 0.2 d outer layer of the catalyst is at least about 2.0 times the average concentration of the platinum in the 0.4 d core of the catalyst. In addition to the surface-impregnated platinum, it is also an aspect of this invention that the second component is eggshell-impregnated. The second component is considered to be eggshell-impregnated when the average concentration of said second component within the 0.2 d outer layer of the catalyst is at least about 2.5 times the average concentration of the component in the 0.4 d core of the support. This characterization of the catalytic composite is intended to describe two distinct concentration gradients upon and within the catalyst support. The concentration of each surface-impregnated metal or component tapers off as the center of the support is approached. The actual gradient of the platinum or the second component within the catalyst support varies depending upon the exact manufacturing method employed to fabricate the catalyst. However, it is preferred to place much of the surface-impregnated platinum upon the 0.2 d outer layer of the catalyst particle so that the expensive surface-impregnated metal component can be efficiently used in a dehydrogenation process. It is also preferred to place much of the surface-impregnated second modifier component upon the 0.2 d outer layer of the catalyst.

Although it is not understood completely, it is believed that by impregnating a substantial part of the surface-impregnated platinum and surface-impregnated second component in the outer layer of the support, formation of large coke molecules from small coke precursor molecules is substantially prevented in the outer layer. This has two favorable effects. First, the platinum and second component sites in the outer layer of the support where most of the dehydrogenation reactions occur remain accessible to the hydrocarbon feed for longer periods of time. Secondly, catalyst support pore mouths in the outside layer of the alumina support are not plugged and continue to provide easy access to incoming and outgoing reactant and product molecules.

One essential component of the catalyst composite is platinum. Platinum most likely exists within the catalytic composite in a near-zero-valent state in chemical combination with one or more of the other ingredients of the catalyst composite. Generally, this component may be present in the catalyst composite in an amount ranging from 0.1 to 10.0 wt. %. However, relatively small amounts are preferred. In fact, platinum generally will comprise about 0.01 to about 2 wt. % of the catalytic composite, calculated on an elemental basis. Excellent results are obtained when the catalyst composite contains about 0.05 to about 1 wt. % of platinum. For the purpose of this application, all references to weight per cent should be understood to use the whole weight of the catalyst composite as a basis.

The platinum may be incorporated into the catalytic composite of the invention by any suitable means which results in surface impregnation of the platinum and uniform dispersion of the other catalytic components excepting the iridium or osmium component. The platinum is preferably surface impregnated via the formulation of a chemical complex of platinum. A useful complex is strongly attracted to the refractory oxide support and this strong attraction results in the complex of platinum being retained primarily near the outer surface of the catalyst.

Any compound that is known to complex with platinum and with the refractory oxide support is useful in the preparation of the surface-impregnated catalyst of the present invention. However, it has been found that a multi-dentated ligand is very useful in complexing platinum and the refractory oxide support resulting in the surface impregnation of the platinum. Multi-dentated ligands are compounds that contain more than one appendage that can bond strongly to the oxide support. Such appendages would typically comprise carboxylic acids, amine groups, thiol groups, phosphorus groups, or other strongly polar groups of chemical components. It is also an aspect of this invention that the multi-dentated ligand contains a first functional group such as —SH or $PR_2$ (where R is a hydrocarbon) that has a high affinity towards platinum and a second functional group comprising a carboxylic acid or the like component that can be strongly absorbed onto the metal oxide support. This preferred property of the multi-dentated ligand effectively insures that the platinum does not uniformly penetrate the catalyst support because the multi-dentated ligand binds quickly and strongly to both the support and the platinum. Examples of some useful multi-dentated ligands include thiomalic acid, thiolactic acid, mercapto propionic acid, thiodiacetic acid, thioglycollic acid, and thiopropionic acid among others.

The preferred multi-dentated ligand of the instant invention is thiomalic acid. The thiomalic acid, the platinum group metal, and the catalyst base can be combined in a number of ways which result in the surface impregnation of the catalyst base with platinum. In one method, thiomalic acid and platinum are allowed to complex in a solution before introduction of a catalyst base to the solution. The complex containing solution is evaporated with the complex containing the platinum remaining on the outside layer of the catalyst support resulting in the surface impregnation of platinum. In an alternative method, the refractory oxide support is allowed to contact a solution containing thiomalic acid for a time. A second solution containing platinum is then added to the mixture and the solution containing the mixture is evaporated. The platinum complexes with the thiomalic acid already on the outer portion of the support. This procedure also results in the surface impregnation of the platinum.

Typical of some of the platinum group compounds which may be employed in preparing the catalyst of the invention are chloroplatinic acid, ammonium chloroplatinate, bromoplatinic acid, platinum dichloride, platinum tetrachloride hydrate, platinum dichlorocarbonyl dichloride, dinitrodiaminoplatinum, etc. Chloroplatinic acid is preferred as a source of platinum.

Another essential component of the catalytic composite of this invention is a first component. The first component is selected from Group IA and Group IIA elements of the Periodic Table of the Elements or mixtures of such elements. Group IA and Group IIA elements are also commonly known as alkali metals and alkaline earth metals, respectively. Such IA and IIA elements include lithium, sodium, potassium, rubidium, cesium, magnesium, calcium, strontium, and barium.

The first component may exist within the catalytic composite as a relatively stable compound such as an oxide or sulfide or in combination with one or more of the other components of the composite, or in combination with an alumina support such as in the form of a metal aluminate. Since, as is explained hereinafter, the composite containing the first component is always calcined in an air atmosphere before use in the conversion of hydrocarbons, the most likely state for the first component under dehydrogenation reaction conditions is the metallic oxide. Regardless of its precise form in the catalytic composite, the amount of first component is preferably selected to provide a catalytic composite containing about 0.01 to about 10.0 wt. % of the first component, and more preferably about 0.05 to about 5.0 wt. %. Best results are ordinarily achieved when this component comprises lithium, potassium, cesium, or mixtures thereof.

This first component may be combined with the support in any manner known to those skilled in the art such as by impregnation, coprecipitation, physical admixture, ion exchange, etc. The first component may be uniformly or non-uniformly distributed throughout the catalyst. Uniform distribution of the first component is preferred. However, the preferred procedure involves impregnation of the first component on the support either before or after it is calcined. It may be impregnated before, during, or after the other components are added to the support. Best results are ordinarily obtained when this component is added in conjunction with or after the platinum and third metal component. Typically, the impregnation of the first component on the support is performed by contacting same with a solution of a suitable, decomposable compound or salt of the desired alkali metal or alkaline earth metal. Hence, suitable compounds include the halides, sulfates, nitrates, acetates, carbonates, and like compounds. For example, excellent results are obtained by impregnating the support after the platinum has been combined therewith with an aqueous solution of lithium nitrate or potassium nitrate.

Another essential component of the instant catalytic composite is a surface-impregnated second component. The second component is surface-impregnated such that the average concentration of said metal or component within the outer 0.2d layer of the support is at least 2.5 times the average concentration of the same metal or component in the 0.4d core portion of the support, where 'd' is the nominal dimension of the catalyst support. The spatial distribution of the second component is always different from the spatial distribution of the surface-impregnated platium, for the purpose of this invention. The second component is always impregnated with a "steeper" concentration gradient than for platinum. Of course, the highest concentrations for both metal components is near the surface. The second component is selected from the group consisting of iridium, and osmium, or mixtures thereof. The second component may be incorporated into the catalytic composite by any method designed to result in the surface-impregnation of the second component. One method of obtaining an surface-impregnation with iridium is to contact a suitable base with a dilute aqueous solution containing chloroiridic acid. Iridium in this form has a very high affinity for alumina and will attach mainly near the outside surface of an alumina support.

As previously stated, the surface-impregnated second component is selected from the group consisting of osmium, iridium, or mixtures thereof. The eggshell surface-impregnated second component may be present in the catalytic composite as an elemental metal or in chemical combination with one or more of the other ingredients of the composite, or as a chemical compound of the component, such as the oxide, oxyhalide, sulfide, halide, and the like. The second component may be utilized in the catalytic composite in any amount which is catalytically effective, such as from 0.01 to 10.0 wt. %, with the preffered amount being about 0.1 to about 5.0 wt. % thereof, calculated on an elemental metal basis. Typically, best results are obtained with about 0.05 to about 3.0 wt. % of surface-impregnated metal. Additionally, it is within the scope of the present invention that beneficial results may be obtained by having more than one of the above-named metals eggshell-impregnated on the catalytic composite.

The surface-impregnated second component may be incorporated into the catalytic composite in any suitable manner which results in the component being concentrated near the outside surface of the catalyst support in the preferred manner. In addition, it may be added at any stage of the preparation of the catalytic composite and the precise method of incorporation used is not deemed to be critical so long as the resulting metal or component is eggshell-impregnated as the term is used herein. A preferred method of incorporating the second component is an impregnation step wherein the support is impregnated with a suitable second component metal-containing aqueous solution. It is also preferred that no acid compounds besides that which might be inherent to the second component are to be added to the impregnation solution. In a particularly preferred method of preparation, the support containing the first and third component and platinum, is subjected to calcination, as is explained hereinafter, prior to the impregnation of the eggshell-impregnated components. Aqueous solutions of water soluble, decomposable metal compounds are preferred, including ammonium hexachloroosmium, dihydridohexachloroosmium, hexachloroosmium hexahydrate, chloroiridic acid, iridium bromide, iridium acetylacetonate, iridium trichloride, iridium tetrachloride, and like compounds.

Another essential component of the catalytic composite of this invention is a third component consisting of elements of Group IVA of the Periodic Table of the Elements or mixtures thereof. Such Group IVA elements include lead, tin, germanium, and mixtures thereof. The effective amount of the third component may be uniformly or non-uniformly distributed throughout the catalyst. It is preferred that the third component be uniformly distributed. Generally, the catalyst will comprise from about 0.01 to about 10.0 wt. % of the third component calculated on an elemental basis on the weight of the final catalytic composite. Preferably, the catalyst will comprise from about 0.05 to about 5.0 wt. % of the third component.

The addition of the third component can be achieved in a number of ways including impregnation with a third component containing solution, or incorporating a third component into the support during support formulation. The latter method, incorporating the third component into the support during the preparation of the support, is the preferred method of the present invention.

Specifically, this method involves adding a third component to the support during its preparation. In the case where the catalyst is formulated from a sol of a desired refractory oxide, the third component would be incorporated into the sol before the support was shaped. If the support were formulated from a powder of a refractory oxide, the third component would be added prior to the forming of a dough into the desired shape of the support.

When the third component of the present invention comprises a germanium component, all of the germanium component may be present in the composite in an oxidation state above that of the elemental metal. This component may exist within the composite as a compound such as an oxide, sulfide, halide, oxychloride, aluminate, etc., or in combination with the support or other ingredients of the composite. Preferably, the germanium component is used in an amount sufficient to result in the catalytic composite containing, on an elemental basis, about 0.01 to about 10.0 wt. % germanium, with best results typically obtained with about 0.05 to about 3.0 wt. % germanium.

Alternatively, the third component may comprise tin. Tin may be present as an elemental metal, as a chemical compound such as an oxide, sulfide, halide, oxychloride, etc., or as a physical or chemical combination with the support or other components of the catalytic composite. The tin component is preferably utilized in an amount sufficient to result in a catalytic composite containing from about 0.01 to about 10.0 wt. % tin, calculated on an elemental basis, with best results obtained at a level about 0.05 to about 5.0 wt. %.

The third component also may comprise a lead component. This component may be present as an elemental metal, as a chemical compound such as an oxide, sulfide halide, etc., or as a physical or chemical combination with the support or other components of the catalytic composite. The lead component is preferably utilized in an amount sufficient to result in a catalytic composite containing about from 0.01 to about 2.0 wt. % lead, calculated on an elemental basis. Typical of lead compounds that can be used are lead chloride and lead nitrate.

Germanium compounds which may be used include germanium oxide, germanium tetraethoxide, germanium tetrapropoxide, germanium tetrachloride, germanium difluoride, germanium tetrafluoride, germanium diiodide, germanium monosulfide and like compounds. One particularly preferred impregnation solution comprises nascent germanium metal dissolved in chlorine water to yield a germanium oxychloride. A second preferred impregnation solution comprises germanium tetrachloride dissolved in anhydrous ethanol.

Suitable tin salts or water-soluble compounds of tin which may be used include stannous bromide, stannous chloride, stannic chloride, stannic chloride pentahydrate, stannic chloride tetrahydrate, stannic chloride trihydrate, stannic chloride diamine, stannic trichloride bromide, stannic chromate, stannous fluoride, stannic fluoride, stannic iodide, stannic sulfate, stannic tartrate, and the like compounds. The utilization of a tin chloride compound, such as stannous or stannic chloride is particularly preferred.

The catalytic composite of the present invention may also contain a halogen component. The halogen component may be either fluorine, chlorine, bromine or iodine or mixtures thereof. Chlorine and bromine are the preferred halogen components. The halogen component, when utilized, is generally present in a combined state with the support and the first component. Although not essential to the invention, the halogen component is preferably well dispersed throughout the catalytic composite. The halogen component, when present, may comprise from more than 0.01 to about 5.0 wt. %, calculated on an elemental basis, of the catalytic composite.

The optional halogen component may be incorporated in the catalytic composite in any suitable manner, either during the preparation of the support or before, while, or after other catalytic components are incorporated. For example, the alumina sol utilized to form the preferred support may contain halogen and thus contribute at least some portion of the halogen content in the catalyst composite. Also, the halogen component or a portion thereof may be added to the catalytic composite during the incorporation of the support with other catalyst components, for example, by using chloroplatinic acid in impregnating a platinum. Also, the halogen component or a portion thereof may be added to the catalyst composite by contacting the support with the halogen or a compound, solution, suspension or dispersion containing the halogen before or after other catalyst components are incorporated with the support. Suitable compounds containing the halogen include acids containing the halogen, for example, hydrochloric acid. Or, the halogen component or a portion thereof may be incorporated by contacting the catalyst with a compound, solution, suspension or dispersion containing the halogen in a subsequent catalyst regeneration step. The optional halogen component is preferably uniformly distributed throughout the catalyst support.

After all the catalyst components have been combined with the support, the resulting catalyst composite will generally be dried at a temperature of from about 100° to about 300° C. for a period of typically about 1 to 24 hours or more and thereafter calcined at a temperature of about 300° to about 600° C. for a period of about 0.5 to about 10 or more hours. Finally, the calcined catalyst composite is typically subjected to a reduction step before use in the hydrocarbon conversion process. This reduction step is effected at a temperature of about 100° to about 650° C. for a period of about 0.5 to about 10 or more hours in a reducing environment, preferably dry hydrogen, the temperature and time being selected to be sufficient to reduce substantially all of the platinum to the elemental metallic state.

Regarding the support material, it is preferably a porous, absorptive material with high surface area of from about 5 to about 500 m²/g. The term "support material" means matter from which the individual, physically-separate particles of support are fashioned. The material should be relatively refractory to the conditions utilized in the hydrocarbon conversion process. It is intended to include within the scope of the instant invention the use of support materials which have traditionally been utilized in hydrocarbon conversion catalysts such as, for example (1) silica or silica gel, silicon carbide, clays, and silicates, including synthetically prepared and naturally occurring ones, which may or may not be acid treated, and including attapulgus clay, china clay, diatomaceous earth, fuller's earth, kaolin, kieselguhr, etc.; (2) ceramics, porcelain, crushed firebrick, bauxite; (3) refractory inorganic oxides such as alumina, titanium dioxide, zirconium dioxide, chromium oxide, beryllium oxide, vanadium oxide, cerium oxide, hafnium oxide, zinc oxide, magnesia, boria, thoria, silica-alumina, silica-magnesia, chromia-alumina, alumina-boria, silica-zirconia, etc.; (4) crystalline zeolitic aluminosilicates such as naturally occurring or synthetically prepared mordenite and/or faujasite, for example, either in the hydrogen form or in a form which has been exchanged with metal cations, (5) spinels such as $MgAl_2O_4$, $FeAl_2O_4$, $ZnAl_2O_4$, $CaAl_2O_4$, and other like compounds having the formula $MO\text{-}Al_2O_3$ where M is a metal having a valence of 2; and (6) combinations of materials from one or more of these groups. The preferred material for the instant support is alumina, especially gamma- or eta-alumina.

Preferably, the catalyst of the present invention is nonacidic. "Nonacidic" in this context means that the catalyst has very little skeletal isomerization activity, that is, the catalyst converts less than 10 mole % of butene-1 to isobutylene when tested at dehydrogenation conditions and, preferably, converts less than 1 mole %. The acidity of the catalyst can be decreased if necessary to make the catalyst nonacidic by increasing the amount of the first component within the claimed range, or by treating the catalyst with steam to remove some of the halogen component.

While not a specific aspect of this invention, it is anticipated that a crystalline aluminosilicate zeolite could comprise a portion of the material for the support of this invention. Such a support material would comprise a mixture of a refractory oxide support and a zeolite. The support could then be impregnated with catalytic components as explained herein.

As heretofore indicated, the support of the present invention has a nominal dimension (d) of from 50 to 10,000 microns. No point within the support is more than 0.5 d from the outside surface of the support, where d is the nominal dimension. Thus if the particle is spherical, it must have a diameter of at least about 50 microns. If it is cylindrical (as in the case of an extrudate), the diameter of the circular cross section must be at least about 50 microns and the length of the cylinder must be at least about 50 microns. Likewise if the particle shape of the extrudate is a cube or elongated box, no side may be less than about 50 microns or greater than 10,000 microns and the length must be at least 50 microns. The nominal dimension of a bee's waxen honeycomb, the shape of which certainly is within the scope of this invention, would be the thickness of material separating two adjacent hexagonal cells. Alternatively, the support shape could be cellular or that of a polylobed extrudate. The terms surface-impregnated and nominal dimension were defined with the intent that they be construed broadly.

The preferred alumina support material may be prepared in any suitable manner from synthetic or naturally occurring raw materials. The support may be formed in any desired shape such as spheres, pills, cakes, extrudates, rings, monoliths, etc. A preferred shape of support is the sphere. It is essential that the support size be such that it has a nominal dimension of at least about 50 microns and no greater than about 10,000, though particles having a nominal dimension of about 1600 microns or greater are preferred.

To make alumina spheres for use as support aluminum; metal is converted into an alumina sol by dissolving it in a suitable acid, and then a mixture of the resulting sol and a gelling agent such as urea are dropped into an oil bath to form balls of alumina gel. The oil-drop method of forming such alumina gel spheres is well known in the art. U.S. Pat. No. 2,620,314 teaches the method and is incorporated herein by reference. The balls of alumina gel are easily converted into the preferred gamma- or eta-alumina carrier material by known methods including aging, drying and calcining. To make alumina cylinders, an alumina powder is mixed with water and enough of a suitable peptizing agent such as nitric acid, for example, until an extrudable dough is formed. The dough is then extruded through a suitably sized die and cut to form extrudate particles. Other shapes of the alumina support material may also be prepared by conventional methods. After the alumina particles are shaped, generally they are dried and calcined. The alumina support may be subjected to intermediate treatments during its preparation, including washing with water or with a solution of ammonium hydroxide, for example which treatments are well known in the art. As mentioned, the third component is preferably added, and other components may be added to the preferred alumina support material during its preparation. For example, the third component can be cogelled or coprecipitated with the alumina hydrosol or it may be added to the extrudable alumina dough, etc.

As indicated above, the catalytic composite of the present invention has particular utility as a hydrocarbon conversion catalyst. The hydrocarbon which is to be converted is contacted with catalytic composite at hydrocarbon conversion conditions. These conditions include a a temperature of from about 200° C. to 10000° C., pressure of from atmospheric to about 25 atmospheres gauge and liquid hourly space velocities (LHSV) of from about 0.1 to about 300 hr$^{-1}$.

According to one embodiment of the invention, dehydrogenatable hydrocarbons are contacted with the catalytic composite of the instant invention in a dehydrogenation zone maintained at dehydrogenation conditions. This contacting may be accomplished in a fixed catalyst bed system, a moving catalyst bed system, a fluidized bed system, etc., or in a batch-type operation. A fixed bed system is preferred. In this fixed bed system the hydrocarbon feed stream is preheated to the desired reaction temperature and then passed into the dehydrogenation zone containing a fixed bed of the catalyst. The dehydrogenation zone may itself comprise one or more separate reaction zones with heating means between to ensure that the desired reaction temperature can be maintained at the entrance to each reaction zone. The hydrocarbon may be contacted with the catalyst bed in either upward, downward or radial flow fashion. Radial flow of the hydrocarbon through the catalyst bed is preferred for commercial scale reactors. The hydrocarbon may be in the liquid phase, a mixed vapor-liquid phase or the vapor phase when it contacts the catalyst. Preferably, it is in the vapor phase.

Hydrocarbons which may be dehydrogenated include dehydrogenatable hydrocarbons having from 2 to 30 or more carbon atoms. These hydrocarbons would include normal paraffins, branched paraffins, cycloparaffins, normal olefins, branched olefins, cycloolefins, diolefins, polyolefins, and the like hydrocarbons.

Examples of preferred feedstock paraffins include the normal paraffins ethane, propane, butane, pentane, hexane, and the like up to $C_{30}$ normal paraffin. Preferred branched paraffins include isobutane, isopentane, isohexane, 2-methyl-1-dodecane, and the like hydrocarbons. Preferred cycloparaffins include cyclobutane, cyclopentane, cyclohexane, cyclododecane, and like cycloparaffins.

Examples of olefins useful as feedstock in the dehydrogenation process of this invention include normal olefins such as ethylene, propylene, 1-butene, 2-butene, 1-pentene, 2-pentene, 1-dodecene, and 4-dodecene among others. Useful branched olefins include isohexene, isopentene, 3-methyl-1-dodecene, and 4-methyl-1-nonene among others. Also useful are cycloolefins such as cyclooctene, cyclopentene, cyclohexene, cyclononene, and cyclododecene. Finally, diolefins and polyolefins useful in the process include among others 1,9-decadiene, cyclodeca-1,9-diene, 1,7-decadiene, and 1,5-decadiene. The catalytic composite is particularly useful for dehydrogenating hydrocarbons such as those mentioned above having from 2 to 15 or more carbon atoms.

Dehydrogenation conditions include a temperature of from about 400° to about 900° C., a pressure of from about 0.01 to 10 atmospheres, and a liquid hourly space velocity (LHSV) of from about 0.1 to 300 hr$^{-1}$. For normal paraffins generally, a lower molecular weight species requires higher temperature for comparable conversion. The pressure in the dehydrogenation zone is maintained as low as practicable, consistent with equipment limitations, to maximize the chemical equilibrium advantages. The preferred dehydrogenation conditions of the process of this invention include a temperature of from about 400°–700° C., a pressure from about 0.1 to 5 atmospheres, and a liquid hourly space velocity of from about 0.1 to 300 hr$^{-1}$.

The effluent stream from the dehydrogenation zone generally will contain unconverted dehydrogenatable hydrocarbons, hydrogen and the products of dehydrogenation reactions. This effluent stream is typically cooled and passed to a hydrogen separation zone to separate a hydrogen-rich vapor phase from a hydrocarbon-rich liquid phase. Generally, the hydrocarbon-rich liquid phase is further separated by means of either a suitable selective adsorbent, a selective solvent, a selective reaction or reactions, or by means of a suitable fractionation scheme. Unconverted dehydrogenatable hydrocarbons are recovered and may be recycled to the dehydrogenation zone. Products of the dehydrogenation reactions are recovered as final products or as intermediate products in the preparation of other compounds.

The dehydrogenatable hydrocarbons may be admixed with a diluent gas before, while, or after being passed to the dehydrogenation zone. The diluent material may be hydrogen, steam, methane, carbon dioxide, nitrogen, argon, and the like or a mixture thereof. Hydrogen is the preferred diluent. Ordinarily, when a diluent gas is utilized as the diluent it is utilized in amounts sufficient to ensure a diluent gas to hydrocarbon mole ratio of about 0.1 to about 20, with best results being obtained when the mole ratio range is about 0.5 to 10. The diluent hydrogen stream passed to the dehydrogenation zone will typically be recycled hydrogen which was separated from the effluent of the dehydrogenation zone in the hydrogen separation zone.

Water or a material which decomposes at dehydrogenation conditions to form water such as an alcohol, aldehyde, ether or ketone, for example, may be added to the dehydrogenation zone, either continuously or intermittently, in an amount to provide, calculated on the basis of equivalent water, about 1 to about 20,000 weight ppm of the hydrocarbon feed stream. About 1 to about 10,000 weight ppm of water addition gives best results when dehydrogenating paraffins having from 6 to 30 or more carbon atoms.

To be commercially successful, a dehydrogenation catalyst should exhibit three characteristics, namely high activity, high selectivily and good stability. Activity is a measure of the catalyst's ability to convert reactants into products at a specific set of reaction conditions, that is, at a specified temperature, pressure, contact time and concentration of diluent such as hydrogen, if any. For dehydrogenation catalyst activity, the conversion or disappearance of paraffins in percent relative to the amount of paraffins in the feedstock is measured. Selectivily is a measure of the catalyst's ability to convert reactants into the desired product or products relative to the amount of reactants converted. For catalyst selectivity, the amount of linear olefins in the product, in mole percent, relative to the total moles of the paraffins converted is measured. Stability is a measure of the rate of change with time on stream of the activity and selectivity parameters—the smaller rates implying the more stable catalysts.

Since dehydrogenation of hydrocarbons is an endothermic reaction and conversion levels are limited by chemical equilibrium, it is desirable in order to achieve high conversion to operate at high temperatures and low hydrogen partial pressures. At such severe conditions, it is difficult to maintain high activity and selectivity for long periods of time because undesirable side reactions such as aromatization, cracking, isomerization and coke formation increase. Therefore, it is advantageous to have a new hydrocarbon dehydrogenation catalyst with improved activity, selectivity and stability characteristics.

According to the unique process of the present invention, a mixture of dehydrogenatable hydrocarbons, and an optional diluent gas is contacted with the catalytic composite of the present invention in a dehydrogenation reaction zone maintained at dehydrogenation conditions. This contacting step may be accomplished by using the catalyst in a fixed bed system, a moving bed system, a fluidized bed system, or in a batch type operation. However, in view of the fact that the attrition losses of the valuable catalyst should be minimized and of the well known operational advantages, it is preferred to use either a fixed bed catalytic system, or a dense phase moving bed system such as is shown in U.S. Pat. No. 3,725,249.

If a fixed bed catalytic reaction system is used for the process of the present invention, it is anticipated that the reaction system flowscheme could take many forms. The first possibility is that the reaction system flowscheme would comprise a single reaction zone within a single reactor with single inlet and outlet ports. All co-feeds would enter the inlet of the reactor and products and by-products would leave the system through the reactor outlet port.

Of course, the catalyst could be distributed in a plurality of distinct reactors or a fixed bed reactor system having multiple beds. The choice of the best system would likely depend upon many factors including available equipment, particular reaction speed, and efficiency, as well as optimum reaction conditions for the two distinct reactions being performed. Regardless of the fixed bed catalyst system employed, the hydrocarbon may be contacted with the catalyst bed in either upward, downward, or radial flow fashion. Radial flow of the hydrocarbon through the catalyst bed is preferred for commercial scale reactors. The hydrocarbon must be in the vapor phase when it contacts the catalyst.

The process of the instant invention can also be accomplished in a moving bed catalytic system. In such a system, the catalyst of the instant process would continuously move through a plurality of dehydrogenation reaction zones and, once deactivated, pass to a continuous catalyst regeneration system. After regeneration, the catalyst would be returned to the reaction system.

The following examples are introduced to further describe the catalyst and process of the invention. The examples are intended as illustrative embodiments and should not be considered to restrict the otherwise broad interpretation of the invention as set forth in the claims appended hereto.

EXAMPLE I

In order to demonstrate the advantages to be achieved by the present invention, a catalyst support was prepared. First, a spherical alumina support was prepared by the well-known oil-drop method. A tin component was incorporated in the support by commingling a tin component precursor with the alumina hydrosol and thereafter gelling the hydrosol. The tin component in this case was uniformly distributed throughout the catalyst particle. The spherical alumina support containing 0.5 wt. % tin had a diameter of about 1600 microns. The spherical tin containing base was then dried at 150° C. for 2 hours followed by calcination at 650° C. for 2 hours.

EXAMPLE II

This example details the preparation of Catalyst A, a catalyst of this invention which comprises two distinct surface-impregnated components. A tin-containing support, as prepared in Example I was utilized as part of the catalyst of this example. 186 grams of the support material was contacted with 598 grams of an aqueous solution containing 0.94 grams of $LiNO_3$, 8.43 grams of HCl, and 0.58 grams of thiomalic acid (TMA) to make a first mixture. This first mixture was stirred in an evaporating dish at room temperature for 15 minutes and then 66.4 grams of water and 11.6 grams of an aqueous solution containing 0.25 grams of chloroplatinic acid were added to the evaporating dish to make a second mixture. After 15 more minutes of stirred contacting time, the second mixture was transferred to a rotary evaporator. There the second mixture was cold-rolled for 15 minutes and then it was rolled and evaporated for about two and a half hours longer while being heated by steam. The resulting impregnated base was placed in a furnace and calcined for 2.5 hours at 540° C. using air which had been saturated at room temperature with water. Thereafter, the impregnated base was calcined at 540° C. for an additional 15 minutes under dry air and cooled to produce a calcined platinum-impregnated base. At this point, 6.4 grams of the calcined platinum-impregnated base were retained for record and 40% of the balance was designated for further processing as described below in Example III. The remainder was used to make a third mixture. The remainder was contacted with 272.1 grams of water and 1.5 grams of 12.0 wt. % choroiridic acid solution for 15 minutes in a stirred evaporating dish at room temperature. The third mixture was then transferred to a rotary evaporator in which it was cold-rolled for fifteen minutes and then rolled and steam-heated for about 2 hours to produce an iridium-impregnated base. The iridium-impregnated base was then heated in a furnace under air to 300° C., calcined for two and a half hours, and cooled. Then, in the same furnace, the iridium-impregnated base was reheated under nitrogen to 110° C. At that time, the furnace purge gas was changed from nitrogen to hydrogen. Then the temperature in the furnace was elevated to 500° C., and maintained for two hours. Afterwards, the furnace was cooled to 100° C., the hydrogen was stopped, and the flow of nitrogen through the reactor was restored. The resulting surface-impregnated catalyst, designated Catalyst A, was prepared in accordance with the present invention. Catalyst A comprises 0.16 wt. % platinum, 0.24 wt. % iridium, 0.50 wt. % tin, and 0.54 wt. % lithium.

EXAMPLE III

This example details the preparation of Catalyst B, a catalyst of the prior art comprising surface-impregnated platinum but containing substantially no iridium or chloride. The calcined platinum-impregnated base which was designated for further processing in Example II above was further processed as follows to produce Catalyst B. The calcined, platinum-impregnated base was heated in a furnace under air to 300° C., calcined for two and a half hours, and cooled. Then in the same furnace, the calcined, platinum-impregnated was reheated under nitrogen to 110°. At that time, the furnace purge gas was changed from nitrogen to hydrogen. Then the temperature in the furnace was elevated to 500° C., and maintained for two hours. Afterwards the furnace was cooled to 100° C., the hydrogen was stopped, and the flow of nitrogen through the reactor was restored. The resulting surface-impregnated catalyst, designated Catalyst B, was prepared in accordance with the prior art. Catalyst B comprises 0.16 wt. % platinum, substantially no iridium, 0.50 wt. % tin, and 0.54 wt. % lithium.

EXAMPLE IV

Figure 2:
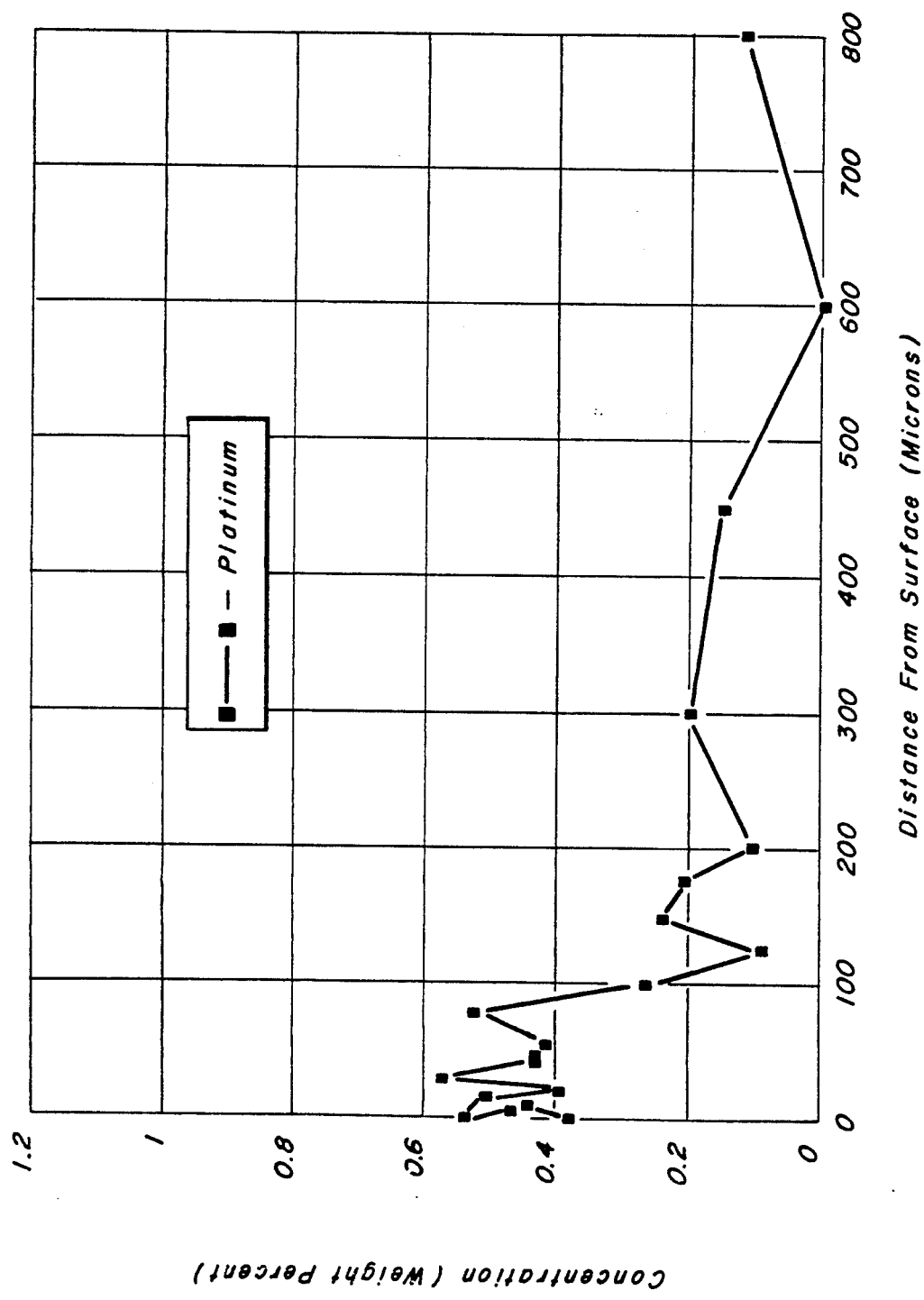

In this example, Catalyst A of the present invention and Catalyst B of the prior art were evaluated by Scanning Electron Microscopy (SEM). The purpose of this analysis was to quantify the distribution of impregnated iridium and platinum across the radius of a catalyst sphere of each example catalyst previously mentioned. FIGS. 1 and 2 represent the results of an electron microscope scan of one catalyst sphere from the batch of Catalyst A prepared as described in Example II and of one catalyst sphere from the batch of Catalyst B prepared as described in Example III, respectively. In each case, a single catalyst sphere was chosen randomly from the batch prepared. Although there are undoubtedly differences between individual catalyst spheres, the measured metals distributions are believed to be typical of the batch. The SEM method is most accurate in comparing the relative concentration of one particular metal in one location with the concentration of the same metal in a different location.

An examination of the platinum and iridium levels across the catalyst spheres of Catalyst A and B, as depicted in FIGS. 1 and 2, shows the platinum of both Catalyst A and Catalyst B to be contained predominantly within the outer layer of the catalyst sphere. For both Catalyst A and Catalyst B, the platinum concentration is about 0.5 wt. % on the surface of the catalyst sphere and diminishes to about 0.2 wt. % at a distance of 160 microns inside the surface of the catalyst sphere. By inspection of FIG. 1, the average concentration of platinum in the outer 320 micron layer is greater than 0.3 wt. %. The concentration of platinum in the 640 micron diameter core of the Catalyst A sphere is about 0.1 wt. %. Therefore, the platinum of both Catalyst A and Catalyst B is surface-impregnated because the average concentration in the 0.4 d catalyst core.

The concentration gradient for the iridium of the catalyst A sphere is much steeper than that for the platinum. The distribution of iridium in Catalyst A meets the definition for surface-impregnation. It also meets the definition for eggshell surface-impregnation. By inspection of FIG. 1, the average concentration of iridium in the 320 micron outer layer is greater than 0.25 wt. %. The average concentration of iridium in the 640 micron diameter core of the catalyst is less than 0.1 wt. %. The catalyst sphere diameter is about 1600 microns. One can calculate that the average concentration of iridium in the outer 0.2 d catalyst layer is more than 2.5 times the concentration in the 0.4 d catalyst core. Therefore, the iridium distribution depicted in FIG. 1 is that of a dual profile surface-impregnated catalyst sphere.

Catalyst B contains substantially no measurable iridium. It is not a catalyst of this invention.

EXAMPLE V

This example compares the performance of a catalyst of this invention with that of a catalyst not of this invention in a process for the dehydrogenation of dehydrogenatable hydrocarbons. The purpose of the comparison is to prove that the performance of a catalyst which comprises surface-impregnated platinum and surface-impregnated iridium is superior to the performance of a catalyst which comprises surface-impregnated platinum but contains substantially no iridium. Catalyst A, which comprises iridium is the catalyst prepared as described in Example II above. Catalyst B, which comprises substantially no iridium, is the catalyst prepared as described in Example III above. The platinum and iridium distributions for Catalyst A and B are graphically depicted in FIGS. 1 and 2, respectively.

The catalysts were evaluated for their ability to dehydrogenate $C_{10}$–$C_{13}$ paraffins in a dehydrogenation pilot plant. The pilot plant was operated at an inlet temperature of 500° C., at a pressure of 0.68 atmospheres, and at a weight hourly space velocity of 120 hr$^{-}$. Hydrogen and water were both co-feeds to the reaction zone. Water was added to the feed at a rate such that the feed comprised 2000 wt. ppm of water. Hydrogen was added to the feed so that the $H_2$/hydrocarbon molar feed ratio was 3. Finally, the hydrocarbon feedstock comprised by weight 0.1% n-$C_9$, 21.6% n-$C_{10}$, 39.4% n-$C_{11}$, 27.3% n-$C_{12}$, 8.2% n-$C_{13}$, 0.7% n-$C_{14}$, and 2.7% nonnormals.

The two catalysts were evaluated for their ability to convert the normal paraffins into alternative compounds (n-paraffin conversion) and for their ability to produce normal olefinic conversion products (TNO selectivity). The results of the pilot plant testing can be found in Table 1 below.

TABLE 1

| Hours on Stream | N-Paraffin Conversion (wt. %) | | TNO Selectivity (wt. %) | |
|---|---|---|---|---|
| | Catalyst A | Catalyst B | Catalyst A | Catalyst B |
| 2 | 20.39 | 17.26 | 85.52 | 83.46 |
| 4 | 18.77 | 11.44 | 85.95 | 80.22 |
| 6 | 17.16 | 11.47 | 87.03 | 83.40 |
| 8 | 15.54 | 9.15 | 90.37 | 82.45 |
| 10 | 14.58 | 9.10 | 87.94 | 83.98 |
| 14 | 14.71 | 8.71 | 87.46 | 83.55 |
| 18 | 14.45 | 7.70 | 87.40 | 84.10 |
| 22 | 12.57 | 6.50 | 89.59 | 83.18 |
| 26 | 11.83 | — | 89.95 | — |
| 30 | 11.40 | 6.25 | 90.37 | 85.24 |
| 34 | 11.04 | — | 90.62 | — |
| 38 | 11.02 | 5.74 | 90.88 | 86.05 |

The results of the pilot plant tests indicate that catalyst which comprises surface-impregnated platinum and eggshell surface-impregnated iridium exhibits dehydrogenation performance superior to that of a similar catalyst comprising platinum but substantially no iridium.

What is claimed is:

1. A catalytic composite comprising a first component selected from Group IA and Group IIA elements of the Periodic Table of the Elements or mixtures thereof, a second component selected from iridium, osmium, or mixtures thereof, a third component selected from one or more elements of Group IVA of the Periodic Table of the Elements, platinum, and a support having a nominal dimension (d) of from about 50 to 10,000 microns, the catalytic composite characterized in that the platinum is surface-impregnated upon the support such that the average concentration of the platinum in the outer 0.2 d layer of the support is at least 2.0 times the average concentration of the platinum in the 0.4 d core of the support, in that the second component is surface-impregnated upon the support such that the average concentration of the second component in the outer 0.2 d layer of the support is at least 2.5 times the average concentration of the second component in the 0.4 d core of the support, and in that the ratio of said outer 0.2 d layer platinum average concentration to said 0.4 d core platinum average concentration is not more than 0.8 times the ratio of said outer 0.2 d layer second component average concentration to said 0.4 d core second component average concentration.

2. The catalytic composite of claim 1 further characterized in that the third metal component comprises tin.

3. The catalytic composite of claim 1 further characterized in that the first component is lithium.

4. The catalytic composite of claim 1 further characterized in that the surface-impregnated second component is iridium.

5. The catalytic composite of claim 1 further characterized in that the support comprises alumina.

6. The catalytic composite of claim 1 further characterized in that it comprises an optional halogen component.

7. The catalytic composite of claim 6 further characterized in that the optional halogen component comprises a chlorine component.

8. A catalytic composite comprising from 0.01 to 10.0 wt. % of a first component selected from Group IA and Group IIA elements of the Periodic Table of the Elements or mixtures thereof, from 0.01 to 5.0 wt. % of a second component selected from iridium, osmium, or mixtures thereof, from 0.01 to 10.0 wt. % of a third component selected from elements of Group IVA of the Periodic Table of the Elements or mixtures thereof, from 0.01 to 5.0 wt. % platinum, and an alumina support having a nominal dimension (d) of from about 50 to 10,000 microns, the catalytic composite characterized in that the platinum is surface-impregnated such that the average concentration of the platinum in the outer 0.2 layer of the support is at least 2.0 times the average concentration of the platinum in the 0.4 d core of the support, in that the second component is surface-impregnated such that the average concentration of the second component in the outer 0.2 d layer of the support is at least 2.5 times the average concentration of the second component in the 0.4 d core of the support, and in that the ratio of said outer 0.2 d layer platinum average concentration to said outer 0.2 d layer second component average concentration is 0.8 or less.

9. The catalytic composite of claim 8 further characterized in that the third component is tin.

10. The catalytic composite of claim 8 further characterized in that the second component is lithium.

11. A catalytic composite comprising from 0.1 to 5.0 wt. % lithium, from 0.1 to 2.0 wt. % iridium, from 0.1 to 5.0 wt. % tin, from 0.1 to 2.0 wt. % platinum, and an alumina support having a nominal dimension (d) of about 850 to 2500 microns, characterized in that the platinum is surface impregnated such that the average concentration of the platinum in the outer 0.2 d layer of the alumina support is at least 2.0 times the average concentration of the platinum in the 0.4 d core of the alumina support, in that the iridium component is surface-impregnated such that the average concentration of the iridium in the outer 0.2 d layer of the alumina support is at least 2.5 times the average concentration of the iridium in the 0.4 d core of the alumina support, and in that the concentration gradient of iridium within the alumina support is greater than the concentration gradient of platinum within the alumina support.

12. A hydrocarbon conversion process comprising the steps of contacting a hydrocarbon at hydrocarbon conversion conditions with a catalytic composite comprising a first component selected from Group IA and Group IIA elements of the Periodic Table of the Elements or a mixture thereof, and a second component selected from iridium, osmium, and mixtures thereof, a third component selected from the elements of Group IVA of the Periodic Table of the Elements or mixtures thereof, platinum, and a refractory oxide support having a nominal dimension (d) of from 50 to 10,000 microns, and recovering the products of the process, the hydrocarbon conversion process characterized in that the platinum is surface-impregnated upon the refractory oxide support such that the average concentration of the platinum in the outer 0.2 d layer of the refractory oxide support is at least 2.0 times the average concentration of the platinum in the 0.4 d core of the refractory oxide support, in that the second component is surface-impregnated upon the refractory catalyst support such that the average concentration of the second component in the outer 0.2 d layer of the refractory oxide support is at least 2.5 times the average concentration of the second component in the 0.4 d core of the refractory oxide support, and in that the ratio of said outer 0.2 layer platinum average concentration to said 0.4 d core platinum average concentration is not more than 0.8 times the ratio of said outer 0.2 d layer second component average concentration to said 0.4 d core second component average concentration.

13. The process of claim 12 further characterized in that the third modifier component comprises tin.

14. The process of claim 12 further characterized in that the first modifier component comprises lithium.

15. The process of claim 12 further characterized in that the refractory oxide support comprises alumina.

16. A hydrocarbon conversion process comprising the steps of contacting a hydrocarbon at hydrocarbon conversion conditions with a catalytic composite comprising from 0.01 to 10.0 wt. % of a first component selected from Group IA and Group IIA elements of the Periodic Table of the Elements or mixtures thereof, from 0.01 to 5.0 wt. % of a second component selected from iridium, osmium, or mixtures thereof, from 0.01 to 10.0 wt. % of a third component selected from elements of Group IVA of the Periodic Table of the Elements or mixtures thereof, from 0.01 to 5.0 wt. platinum, and an alumina support having a nominal dimension (d) of from about 50 to 10,000 microns, and recovering the products of the process, the hydrocarbon conversion process characterized in that the platinum of the hydrocarbon conversion catalyst is surface impregnated such that the average concentration of the platinum in the outer 0.2 d layer of the alumina support is at least 2.0 times the average concentration of the platinum component in the 0.4 d core of the support, in that the second component of the hydrocarbon conversion catalyst is surface impregnated such that the average concentration of the second component in the outer 0.2d layer of the alumina support is at least 2.5 times the average concentration of the second component in the 0.4 d core of the alumina support, and in that the ratio of said outer 0.2 layer platinum average concentration to said outer 0.2 d layer second component is 0.8 or less.

17. The process of claim 16 further characterized in that the hydrocarbon conversion process is dehydrogenation.

18. The process of claim 17 further characterized in that the hydrocarbon comprises dehydrogenatable hydrocarbons having from 2 to 30 carbon atoms.

19. The process of claim 18 further characterized in that the dehydrogenation conversion process conditions include a temperature of from 400° to 900° C., a pressure of from 0.01 to 10 atmospheres, and a liquid hourly space velocity (LHSV) of from 0.1 to 300hr$^{-1}$.

20. The process of claim 18 further characterized in that the dehydrogenatable hydrocarbons having from 2 to 30 carbon atoms are comprised of normal paraffins, branched paraffins, cycloparaffins, normal olefins, branched olefins, cycloolefins, diolefins, polyolefins, or mixtures thereof.

21. The process of claim 16 further characterized in that a diluent gas is added as a co-feed to the process.

22. The process of claim 21 further characterized in that the diluent gas comprises hydrogen, steam, nitrogen, argon, methane, carbon dioxide, or mixtures thereof.

23. The process of claim 21 further characterized in that the molar ratio of diluent gas to hydrocarbon is from about 0.1 to 20.

24. A dehydrogenation process comprising the steps of contacting a dehydrogenatable hydrocarbon having from 2 to 30 carbon atoms and a diluent gas present at a molar ratio of diluent gas to dehydrogenatable hydrocarbon of 0.1 to 20 at dehydrogenation conditions including a temperature of from 400° to 700° C., a pressure of from 0.1 to 5.0 atmospheres, and a liquid hourly space velocity of from 0.1 to 100 hr$^{-1}$ with a catalytic composite comprising from about 0.1 to about 5.0 wt. % lithium, from about 0.1 to 2.0 wt. % iridium, and from 0.1 to 5.0 wt. % tin, from about 0.1 to about 2.0 wt. % platinum, and an alumina support having a nominal dimension (d) of from 850 to 2500 microns, the process characterized in that the platinum is surface impregnated such that the average concentration of the platinum in the outer 0.2 d layer of the alumina support is at least 2.0 times the average concentration of the platinum component in the 0.4 d core of the alumina catalyst, in that the iridium component is surface impregnated such that the average concentration of the iridium on the outer 0.2 layer of the alumina support is at least 2.5 times the average concentration of the iridium component in the 0.4 d core of the alumina support, and in that the concentration gradient of iridium within the alumina support is greater than the concentration gradient of platinum within the alumina support.

* * * * *